(12) United States Patent
Hutton

(10) Patent No.: US 10,221,962 B2
(45) Date of Patent: *Mar. 5, 2019

(54) TAP WITH INTEGRAL BALL VALVE

(71) Applicant: Peter B. Hutton, Houston, TX (US)

(72) Inventor: Peter B. Hutton, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,201

(22) Filed: Mar. 9, 2018

(65) Prior Publication Data

US 2018/0238469 A1    Aug. 23, 2018

Related U.S. Application Data

(63) Continuation of application No. 15/027,064, filed as application No. PCT/US2014/058889 on Oct. 2, 2014, now Pat. No. 9,915,376.

(60) Provisional application No. 61/886,387, filed on Oct. 3, 2013, provisional application No. 61/894,642, filed on Oct. 23, 2013.

(51) Int. Cl.
| | |
|---|---|
| *F16K 43/00* | (2006.01) |
| *F16K 5/06* | (2006.01) |
| *F16K 27/06* | (2006.01) |
| *F16K 31/60* | (2006.01) |
| *G01L 19/00* | (2006.01) |
| *G01L 13/00* | (2006.01) |

(52) U.S. Cl.
CPC ............... *F16K 43/00* (2013.01); *F16K 5/06* (2013.01); *F16K 5/0642* (2013.01); *F16K 5/0647* (2013.01); *F16K 27/067* (2013.01); *F16K 31/602* (2013.01); *G01L 19/0015* (2013.01); *G01L 13/00* (2013.01); *Y10T 137/612* (2015.04)

(58) Field of Classification Search
CPC .......... F16K 43/00; F16K 5/06; F16K 5/0642
See application file for complete search history.

(56) References Cited

U.S. PATENT DOCUMENTS

| | | | |
|---|---|---|---|
| 4,582,089 A | 4/1986 | Nimberger | |
| 4,672,728 A | 6/1987 | Nimberger | |
| 4,920,626 A | 5/1990 | Nimberger | |
| 4,974,308 A | 12/1990 | Nimberger | |
| 5,064,167 A * | 11/1991 | DiPalma | F16K 5/0694 251/214 |
| 5,752,690 A | 5/1998 | Ellett | |
| 6,609,730 B1 | 8/2003 | Hutton | |
| 6,830,069 B2 * | 12/2004 | Shillito et al. | F16K 5/0631 137/613 |
| 6,871,881 B1 | 3/2005 | Hutton | |
| D541,645 S | 5/2007 | Hutton | |
| 7,458,514 B1 | 12/2008 | Hutton | |
| 7,458,614 B2 | 12/2008 | Hutton | |
| 7,500,581 B2 * | 3/2009 | O'Leary et al. | B67B 7/24 222/1 |

(Continued)

FOREIGN PATENT DOCUMENTS

| | | |
|---|---|---|
| WO | 2014087033 A1 | 6/2014 |
| WO | WO-2014087033 A1 | 6/2014 |

*Primary Examiner* — Kevin Lee
(74) *Attorney, Agent, or Firm* — Nixon Peabody LLP; Thomas P. Pavelko

(57) ABSTRACT

A valved tap is disclosed comprising a tap body having a through bore from a threaded input end to an output end thereof. A globe valve is positioned in the valve body so as to interrupt the flow of fluid in the through bore. The output end of the tap body may comprise a flanged portion connectable to a manifold.

21 Claims, 8 Drawing Sheets

(56) References Cited

U.S. PATENT DOCUMENTS

| | | |
|---|---|---|
| 7,562,907 B2 | 7/2009 | Hutton |
| D615,617 S | 5/2010 | Hutton |
| 7,938,453 B2 * | 5/2011 | George et al. ........ G01L 19/003 |
| | | 285/143.1 |
| 8,365,769 B2 | 2/2013 | Nimberger |
| D714,909 S | 10/2014 | Boothe |
| 8,939,172 B2 | 1/2015 | Nimberger |
| 9,915,376 B2 * | 3/2018 | Hutton .................. F16K 5/0642 |
| 2005/0151372 A1 * | 7/2005 | Hutton ................ G01L 19/0007 |
| | | 285/219 |
| 2006/0283433 A1 * | 12/2006 | Gerardo ................ F41B 11/723 |
| | | 124/74 |
| 2013/0200286 A1 * | 8/2013 | Eagen .................... F16K 5/0636 |
| | | 251/315.08 |
| 2013/0240772 A1 | 9/2013 | Lomax |

* cited by examiner

TAP WITH INTEGRAL BALL VALVE

CROSS-REFERENCE TO RELATED APPLICATIONS

This application is a continuation of U.S. patent application Ser. No. 15/027,064, filed Apr. 4, 2016, now U.S. Pat. No. 9,915,376 which is a 35 U.S.C. § 371 National Stage Application of International Application serial number PCT/US2014/058889, filed Oct. 2, 2014; which in turn, claims domestic benefit priority under 35 U.S.C. § 119 (e), of U.S. Provisional patent application 61/886,387 filed Oct. 3, 2013, and U.S. Provisional patent application Ser. No. 61,894,642, filed Oct. 23, 2013; the entire disclosures of which are herein incorporated by reference in their entireties.

FIELD OF THE INVENTION

The invention relates to taps for attaching to a pipeline containing a flowing fluid, such as oil or gas, as a means of connecting the pressure in the pipeline to a measuring instrument, such as a pressure transmitter. Recently, a new class of measuring instruments to measure a differential pressure, have been introduced to the market. These differential pressure transmitters record a high and a low pressure, taken by taps placed upstream and downstream of an orifice plate, placed in the flow in the pipeline. While it is possible to connect the differential pressure transmitters directly to the high and low pressure taps by means of piping and fittings, it has been found beneficial to interpose a manifold between the taps and the transmitter. The manifolds may be unvalved or valved to interrupt or control the flow to the transmitter. However, maintenance, leaks or damage occurs to the manifold requiring it to be removed, repaired and/or replaced, it is difficult to exchange the manifold without shutting down the flow in the pipeline. This invention provides a valved tap to interrupt the flow through the tap in order to permit installation, removal, maintenance, replacement or repair of downstream equipment, such as piping, fittings, manifolds, transmitters and the like without the need to interrupt fluid flow in the pipeline.

BACKGROUND OF THE INVENTION

Taps for connection to a pipeline are generally known. The taps usually comprise a tap body, one end of which terminates in NPT thread, and the other end of which is designed to mate with a pressure measuring instrument, a manifold, or an adapter. Indeed, some of these taps were stabilized to transfer some of the stress on the NPT threads to the tap body, Several variations are described in U.S. Pat. Nos. 4,974,308; 6,871,881; 7,562,907, and U.S. D541,645, the disclosures of each of which are herein incorporated by reference. However, none of these taps provide a structure, or permit a method, of interrupting the flow through the tap.

The valved tap of the invention may be used as a replacement for any tap, including the stabilized taps of the prior art noted above, in order to cause the interruption of flow through the tap and facilitate downstream installation, removal, maintenance, replacement or repair of downstream equipment, such as piping, fittings, manifolds, transmitters and the like without the need to interrupt fluid flow in the pipeline.

SUMMARY OF THE INVENTION

The present invention provides a ball valve as an integral part of a tap, thereby providing both a method and apparatus for interrupting the flow through the tap to facilitate downstream installation, removal, maintenance, replacement or repair of downstream equipment, such as piping, fittings, manifolds, transmitters, and the like without the need to interrupt fluid flow in the pipeline.

In the tap of the invention, the ball valve is preferable provided with opposing stems, connectable to handles to open, close, or control fluid flow through the valve. In practice, most installations will permit only the use of one handle due to the close proximity in which the high and low pressure taps are mounted not only in proximity to each other, but also to surrounding equipment, including supporting pipes, mounting brackets and related structure necessary to ultimately mount and secure the differential pressure transmitters. Thus, in actual use, only one of the opposing handles need be used in practice when the tap is installed for use in the field. However, the provision of two, opposing stems, provides the installer the option of connecting the handle at different positions, depending on the installed orientation of the tap to other taps or equipment. The tap of the invention may be provided with two installed handles at the factory, or each, or only one, handle may be provided in a kit with the tap of the invention, such that the positioning of the handle is left entirely to the installer in order to provide the option of positioning the handle on the tap after the tap in its actual operative position. Of course, the shape of the handle may be modified from that illustrated without departing from the spirit or scope of the invention.

DETAILED DESCRIPTION OF THE PREFERRED EMBODIMENTS

Figure 8:
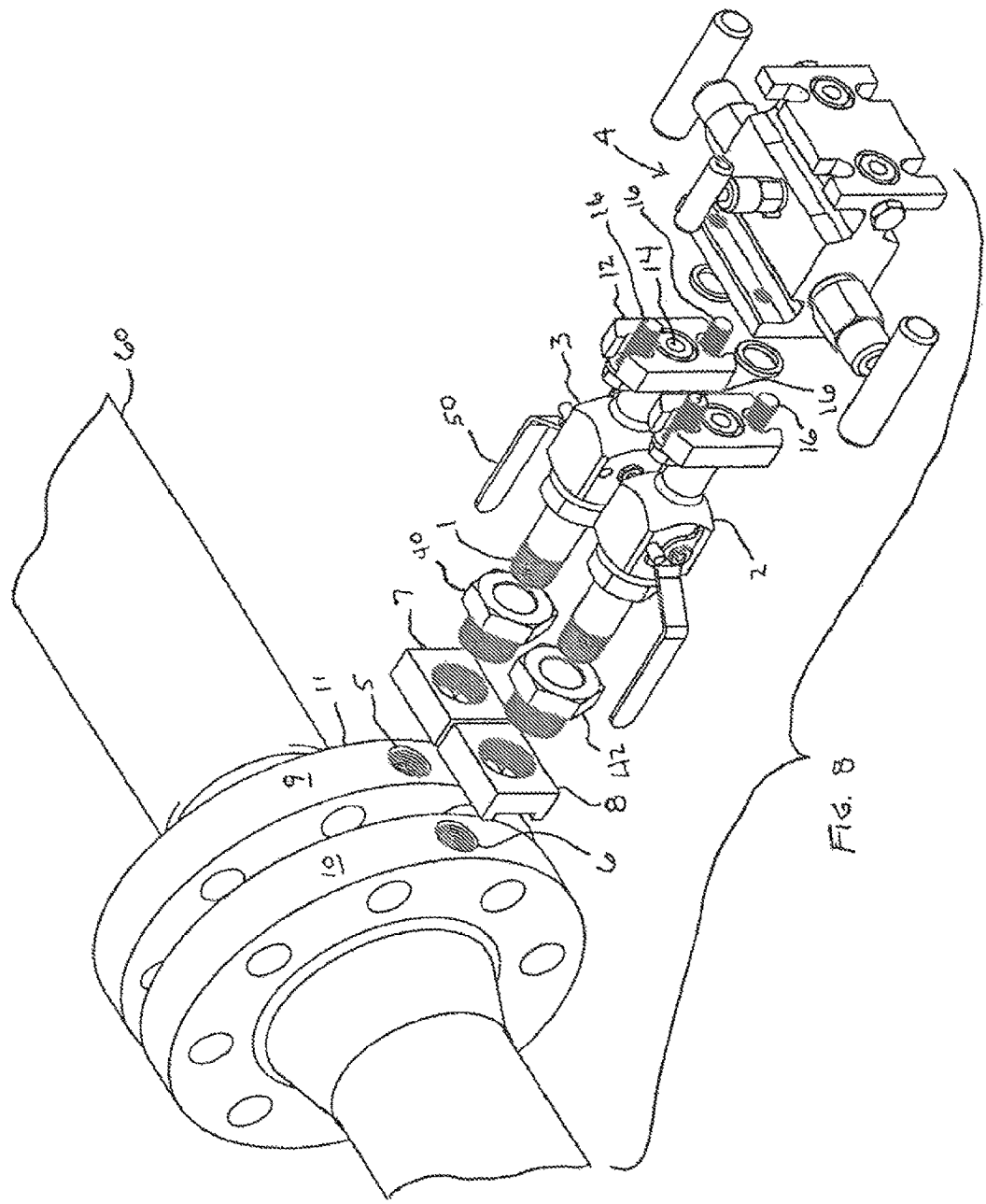

Throughout the specification and drawings, the same numeral will be used to denote the same element. Referring to FIG. 8, there are two taps 2, 3 required for each manifold 4 installation. The taps 2, 3 comprises a male NPT threaded end 1 and a flanged end 12. The flanged end 12 is for attachment to a conventional valved manifold 4. However, it also may be directly connected to an adapter or directly to a pressure measuring device. The male NPT threaded end 1 of taps 2, 3 can be directly threaded into the orifice fittings 5, 6. The same tap 2, 3 can be used with shoes 7, 8 (FIG. 8) in order to stabilize the taps on the curved surfaces 9, 10 of the pipe flange. 11 containing the orifice taps 5, 6 shown in FIG. 8.

Figure 1:
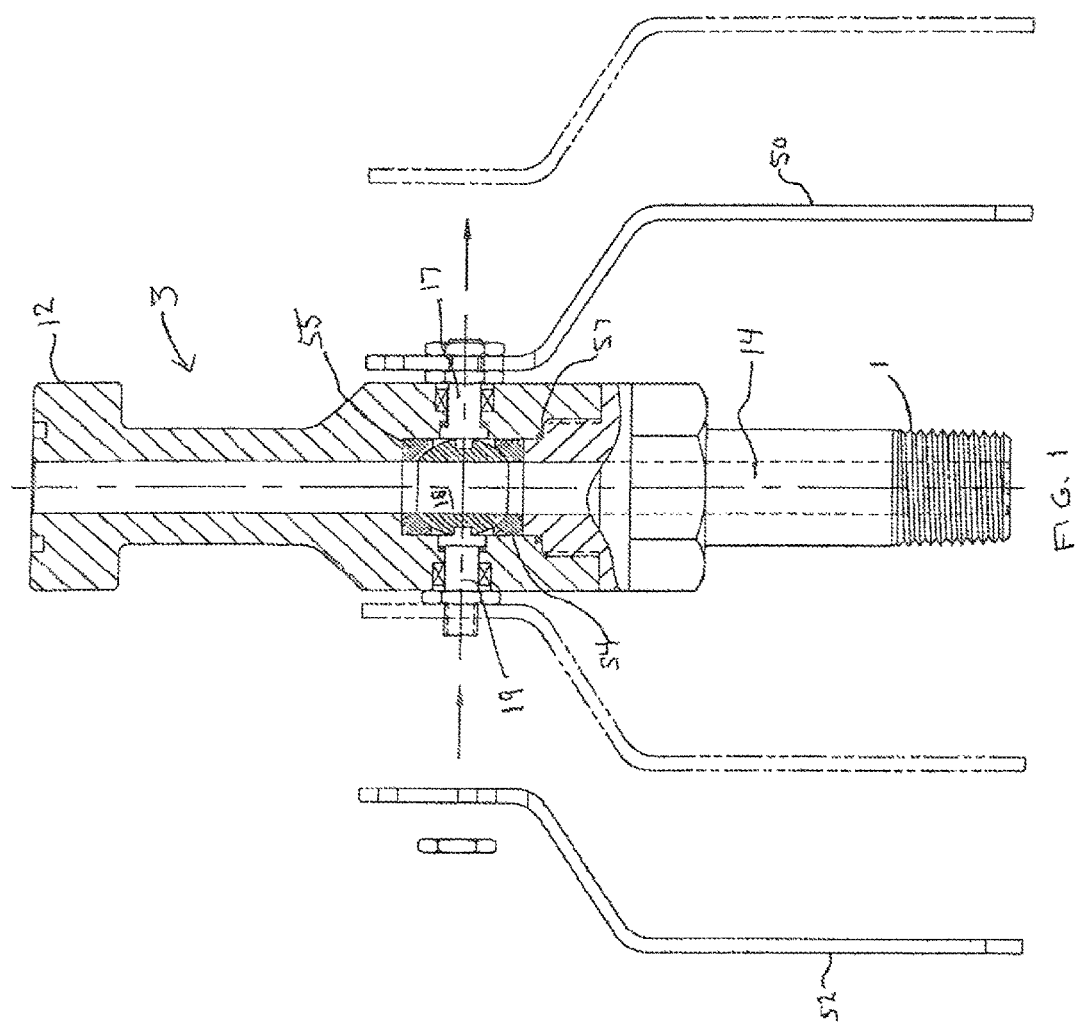
FIG. 1 is a schematic, partially cross-sectional view illustrating the tap of the invention as provided with a ball valve having opposing stems, and at least one handle attached to the stem.
Figure 2:
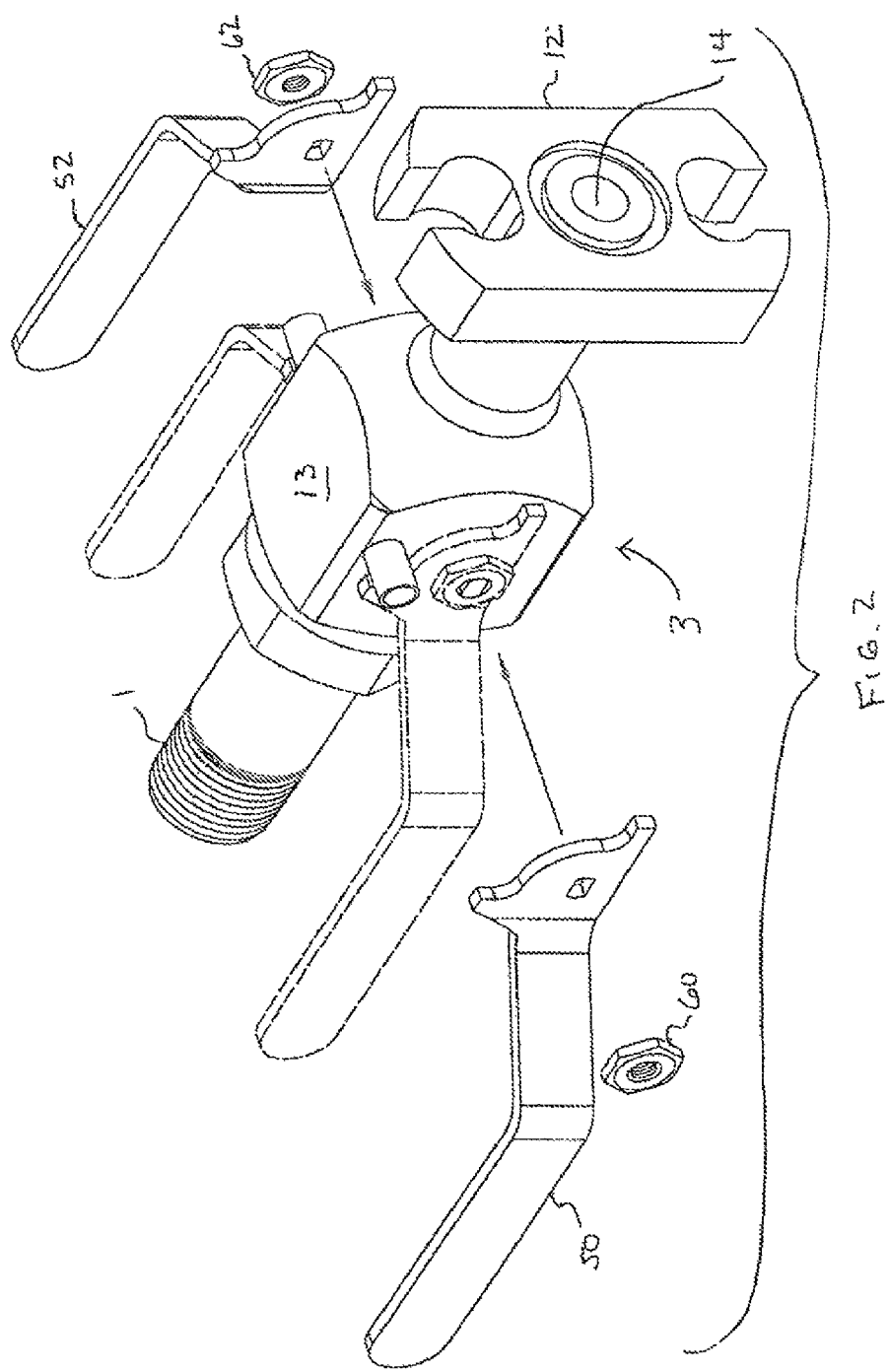
FIG. 2 is a perspective view of the tap of FIG. 1.
Figure 3:
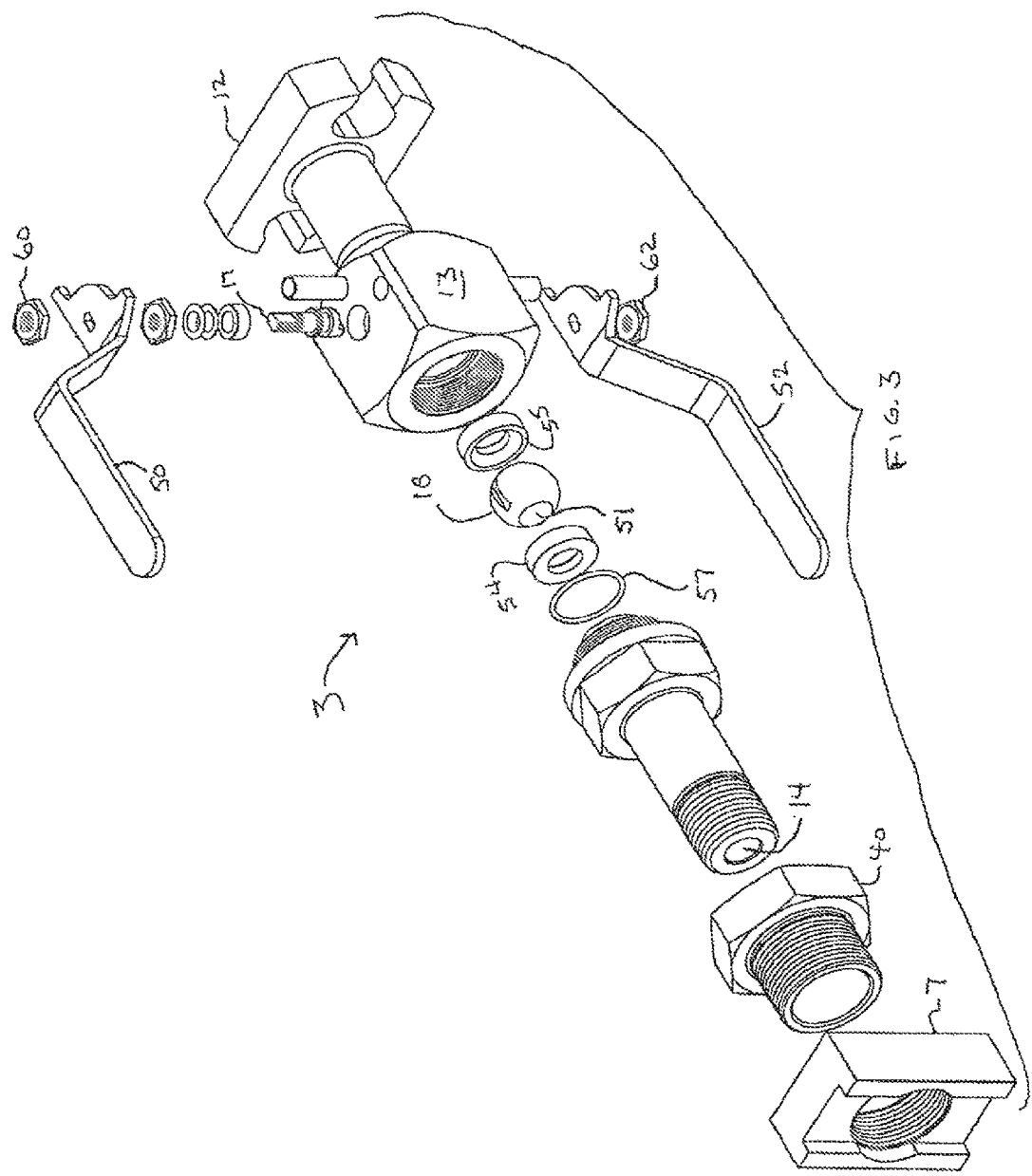
FIG. 3 is an exploded view of the tap of FIG. 2 according to the invention, in combination with one form of stabilizing element.
Figure 4:
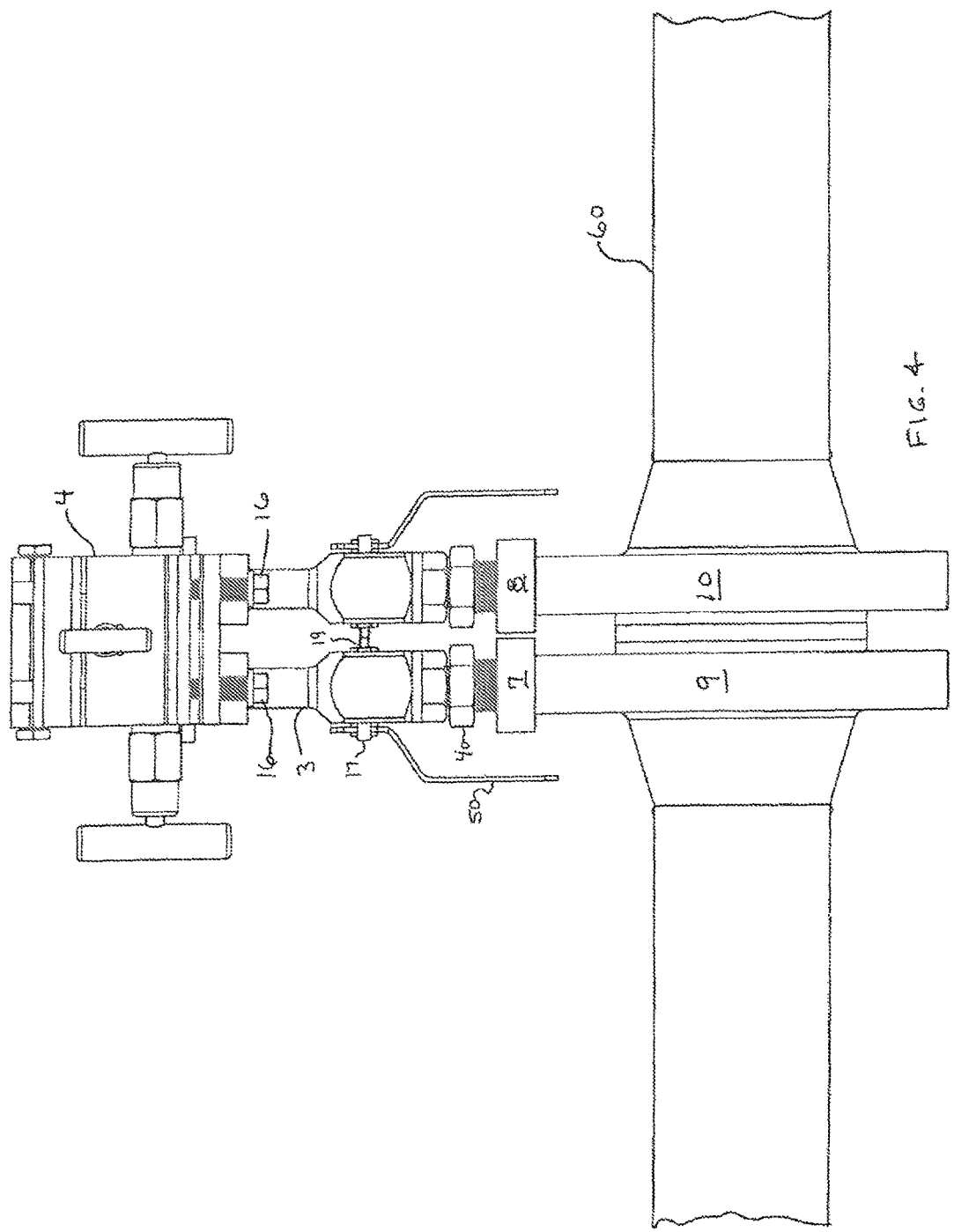
FIG. 4 is a schematic representation of the tap of the invention, installed on a pipeline in a vertical orientation relative to the pipeline and connected to a manifold, and in proximity to a second tap according to the invention.
Figure 5:
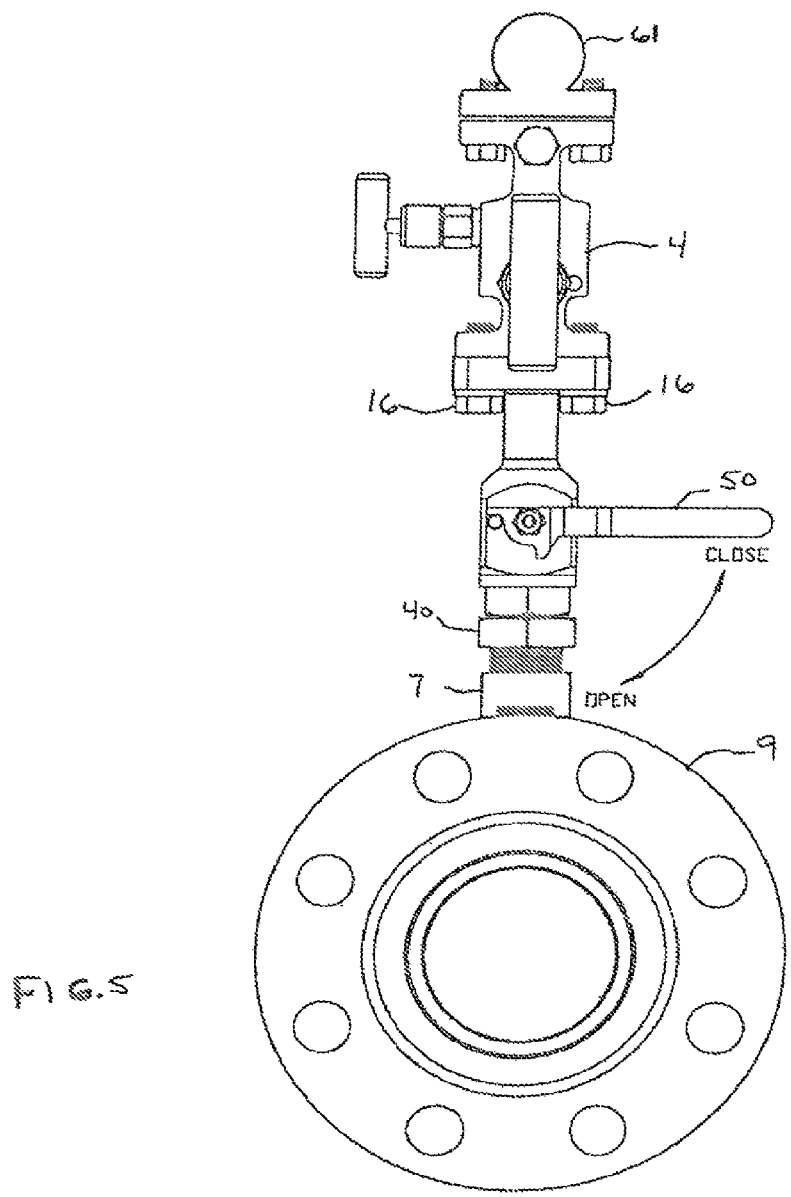
FIG. 5 is a schematic view of the tap of the invention, installed on a flange of a pipeline, showing operation of the handle.
Figure 6:
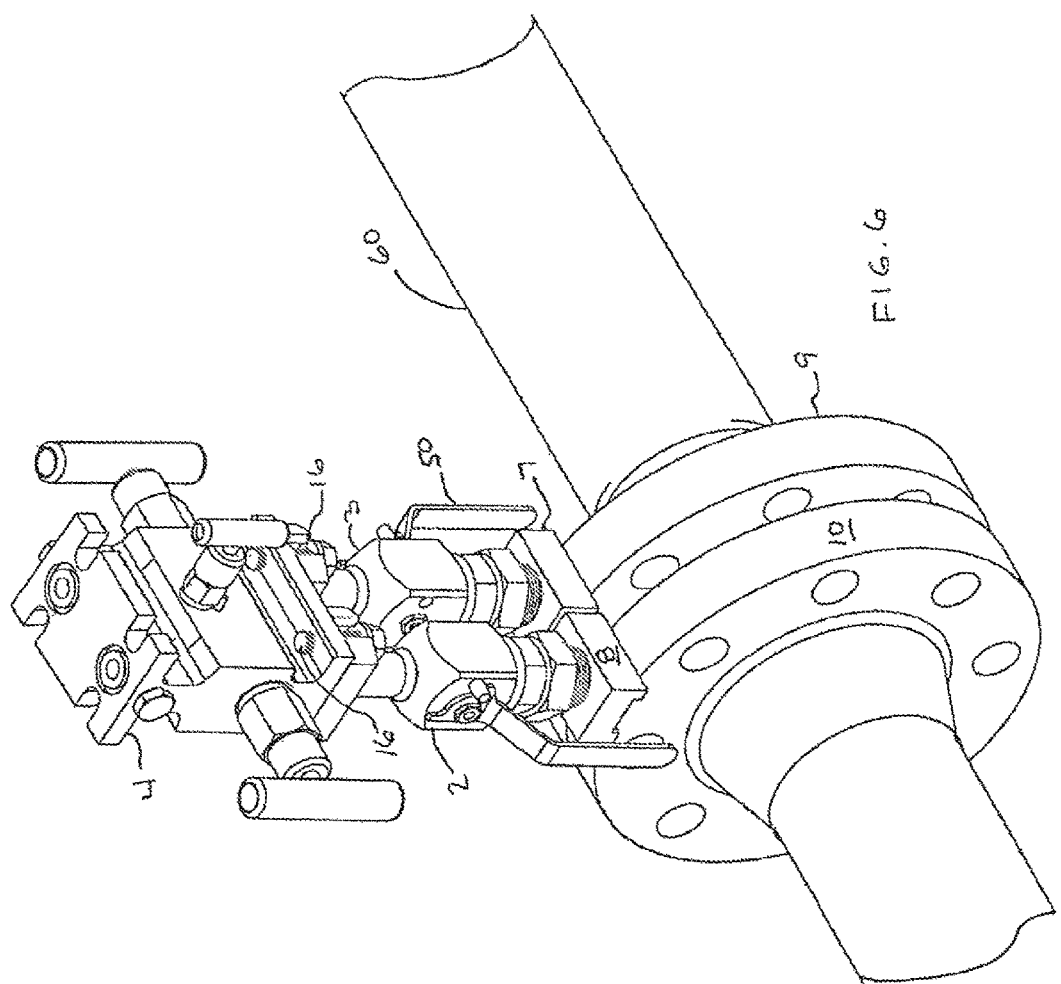
FIG. 6 is a perspective view of FIG. 4.
Figure 7:
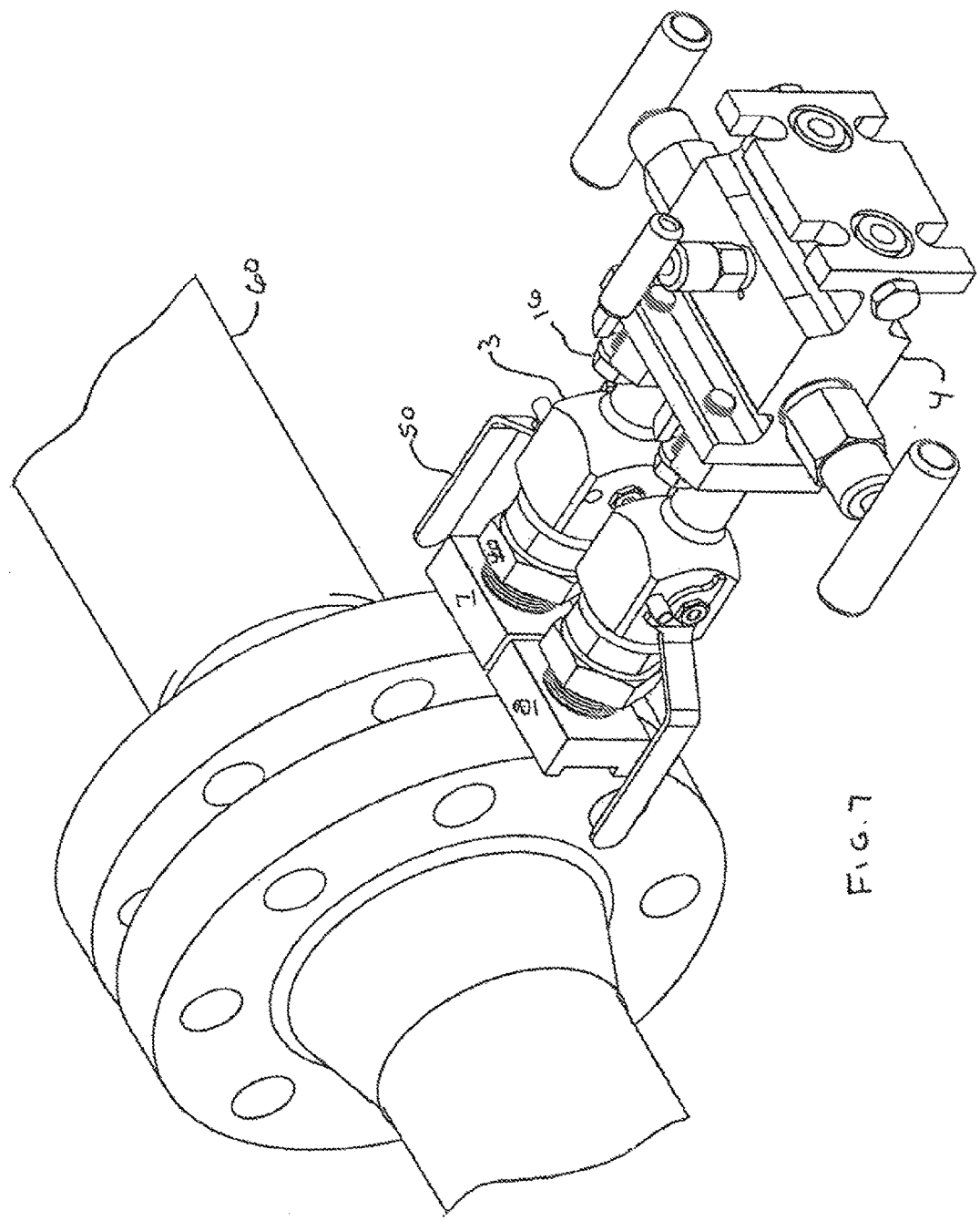
FIG. 7 is a schematic representation of the taps of the invention, installed in a horizontal orientation to a pipeline; and, FIG. 8 is an exploded view of FIG. 7 to further illustrate the details of the connection of the taps of the invention to a pipeline on the NPT end of the tap and to a manifold on a flanged end of the tap.

Turning now to the inventive apparatus of FIG. 1, a tap 3 is provided comprising a tap body 13, the tap body 13 having a through bore 14 therein for communicating the source of pressurized fluid from an orifice fitting 5 (FIG. 8) in a flange 11 to a conventional manifold 4 (FIG. 8). The manifold 4 can be secured to the flange 12 of tap 3 by use of bolts 16 (four of which are shown in FIG. 8). One end of the tap body 13 is provided with threads 1, preferably NPT, so as to mate with the threads in orifice fitting 5 in flange 11. The other end of the tap body 13 is provided with a flange 12 for mounting to a conventional manifold 4 in FIG. 8. Interposed in through bore 14 is ball valve 18 (FIG. 3), which is mounted on opposing stems (one of which 17 is shown in FIG. 3), preferably operated by at least one of opposed handles 50, 52. The provision of opposing stems permits the option of connecting the handle to the stem most conveniently located for operation, taking into account the close proximity of the taps of the invention to another tap, other equipment or supporting structure. Nuts 60, 62, can be provided for securing the handles 50, 52 to the stems 17, 19. It should be here noted, that it is not critical to the invention that both handles 50, 52 are supplied with the tap of the invention, as the ball valve 18 is suitably operable with only one handle. However, the provision of two handles as a kit with the valved tap of the invention facilitates the installation of the tap in the field, by allowing the installation technician to attach, and/or remove, any handle which is in too close in proximity to adjacent structure or equipment, including another tap. This is illustrated in FIGS. 4 and 6-8, Of course, the ball valve 18 could be operated with both handles 50, 52 (FIG. 3), with handles of different design, or even with the handles removed so long as the force operating on at least one of the stems 17, 19 can rotate the ball valve 18 within its seat 54, 55. Seal 57, preferably formed of a high temperature material, such as GRAFOIL™ is provided to prevent leakage. Of course, as the ball valve 18 rotates, the fluid flowing through the bore 51 in the ball 18 can be regulated to the point of complete interruption of flow. In such a condition, the manifold 4, and/or any other downstream equipment, such as a pressure transmitter 61, FIG. 5 can be serviced, replaced, or repaired without interrupting the fluid flow in the pipeline 60.

As in the earlier patents referenced above, the tap body 13 may be provided with means to transfer the load from the NPT threads 1 to the body of the tap. One such manner is by use of the combined nut/sleeve 40, 42. (FIGS. 3 and 8) in combination with shoes 7, 8. Additionally, other manners of transferring the load from the NPT threads 1 to the tap body 13 as shown, for example in my U.S. Pat. Nos. 6,871,881; 7,458,614, or US D541,645, or others, may be employed in connection with the claimed invention.

The invention finds particular utility in pipeline transmission of fluids, especially in the oil and gas industry, but those skilled in the art, having studied the disclosure in connection with the appended. drawings, may readily envision other fields of use.

As many possible embodiments may be made of the invention without departing from the scope thereof, it is to be understood that all matter herein set forth or shown in the accompanying drawings is to be interpreted as illustrative, and not in a limiting sense.

I claim:

1. A tap for attaching to an oil or gas pipeline, said tap comprising:
   a tap comprising two ends, one end of said tap comprising a male NPT threaded end and another end of said tap comprising a flanged end and defining a flow path between the threaded end and the flanged end;
   the tap further comprising a tap body intermediate the threaded end and the flanged end;
   a ball within the tap body;
   the tap further comprising opposed stems, the opposed stems passing through the tap body and into the ball;
   the ball being rotatable within the tap body so as to control the flow path between the threaded end and the flanged end.

2. The tap of claim 1, further comprising at least one handle attached to at least one of the opposed stems.

3. The tap of claim 1, wherein the control of the flow path comprises closing the flow path between the threaded end and the flanged end.

4. The tap of claim 1, wherein the tap body is integral with the flanged end.

5. The tap of claim 1, wherein the tap body defines a single opening of a size and shape which permits the ball to be inserted into the tap body.

6. The tap of claim 1, further comprising a seat for the ball within the tap body.

7. The tap of claim 1, further comprising a through bore within the ball.

8. The tap of claim 1, further comprising a shoe to stabilize the threaded end of the tap on a curved surface of a pipe flange.

9. The tap of claim 1, further comprising a combined nut and sleeve to transfer a load from the NPT threads to the body of the tap.

10. The tap of claim 1, wherein the flanged end is sized and shaped to receive one selected from the group consisting of a manifold, a pressure measuring instrument and an adapter.

11. The tap of claim 1, further comprising a valved manifold mated to the flanged end.

12. A kit comprising the tap of claim 1 and at least one handle.

13. A pipeline configuration including an orifice plate placed between flanges of the pipeline; said orifice plate positioned with the orifice in a flow of the pipeline; said pipeline further comprising at least two taps;
   a first tap of said at least two taps comprising one threaded end; a second tap of said at least two taps comprising one threaded end; said threaded end of said first tap being threadedly connected to a first of said flanges and said second tap being threadedly connected to a second of said flanges;
   each of said first and second taps comprising a distal end opposite its threaded end; each of said taps further comprising a ball valve mounted on opposed stems between the threaded and the distal ends; each of said taps being threaded into their respective first and second flanges by threadedly engaging one end of each taps into threaded bores positioned in said flanges such that the opposed stems of the first tap and the opposed stems of the second tap lie in the same plane when the first and second taps are threadedly engaged in their respective flanges.

14. The pipeline of claim 13, further comprising a handle mounted on at least one of the opposed stems of each of the first and second taps.

15. The pipeline of claim 13, wherein each of the distal ends of the first and second taps are mated to at least one selected from the group consisting of a pressure measuring instrument, a manifold and an adapter.

16. The pipeline of claim 13, further comprising a single manifold connected to the distal ends of each of the first and second taps.

17. The pipeline of claim 16, wherein the manifold is a valved manifold.

18. The pipeline of claim 17, further comprising a differential pressure transmitter.

19. The pipeline of claim 13, wherein each of the first and second taps further comprises a shoe to stabilize the tap.

20. The pipeline of claim 13, wherein each of the first and second taps further comprises a combined nut and sleeve to transfer a load from the threads of the taps.

21. The pipeline of claim 14, wherein the handles are removeably mounted on at least one of the opposing stems.

* * * * *

UNITED STATES PATENT AND TRADEMARK OFFICE
CERTIFICATE OF CORRECTION

PATENT NO. : 10,221,962 B2  
APPLICATION NO. : 15/917201  
DATED : March 5, 2019  
INVENTOR(S) : Peter B. Hutton Page 1 of 1

It is certified that error appears in the above-identified patent and that said Letters Patent is hereby corrected as shown below:

On the Title Page

In item (63) "as" should be deleted and -- April 4, 2016, which is a 35 U.S.C. 371 National Stage application of International --; and, After "PCT/US2014/058889" -- filed -- should be inserted.

Signed and Sealed this  
Seventh Day of May, 2019

Andrei Iancu  
*Director of the United States Patent and Trademark Office*